Oct. 11, 1938.  W. E. HAUPT  2,132,567
CONTROL AND DRIVING METHOD AND APPARATUS
Filed Jan. 21, 1932   3 Sheets-Sheet 3
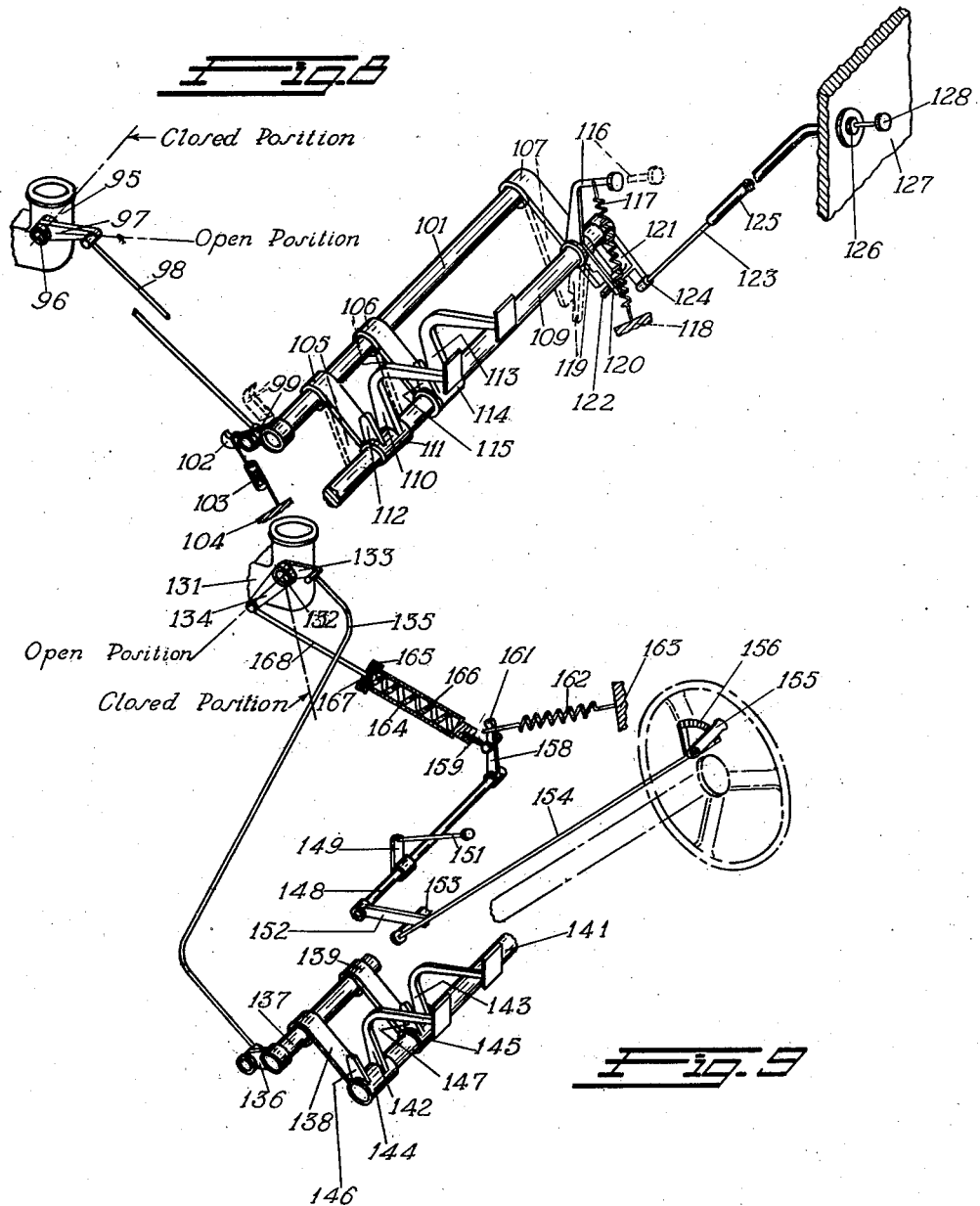
Inventor
William E. Haupt
By
Strauch & Hoffman
Attorneys Patented Oct. 11, 1938

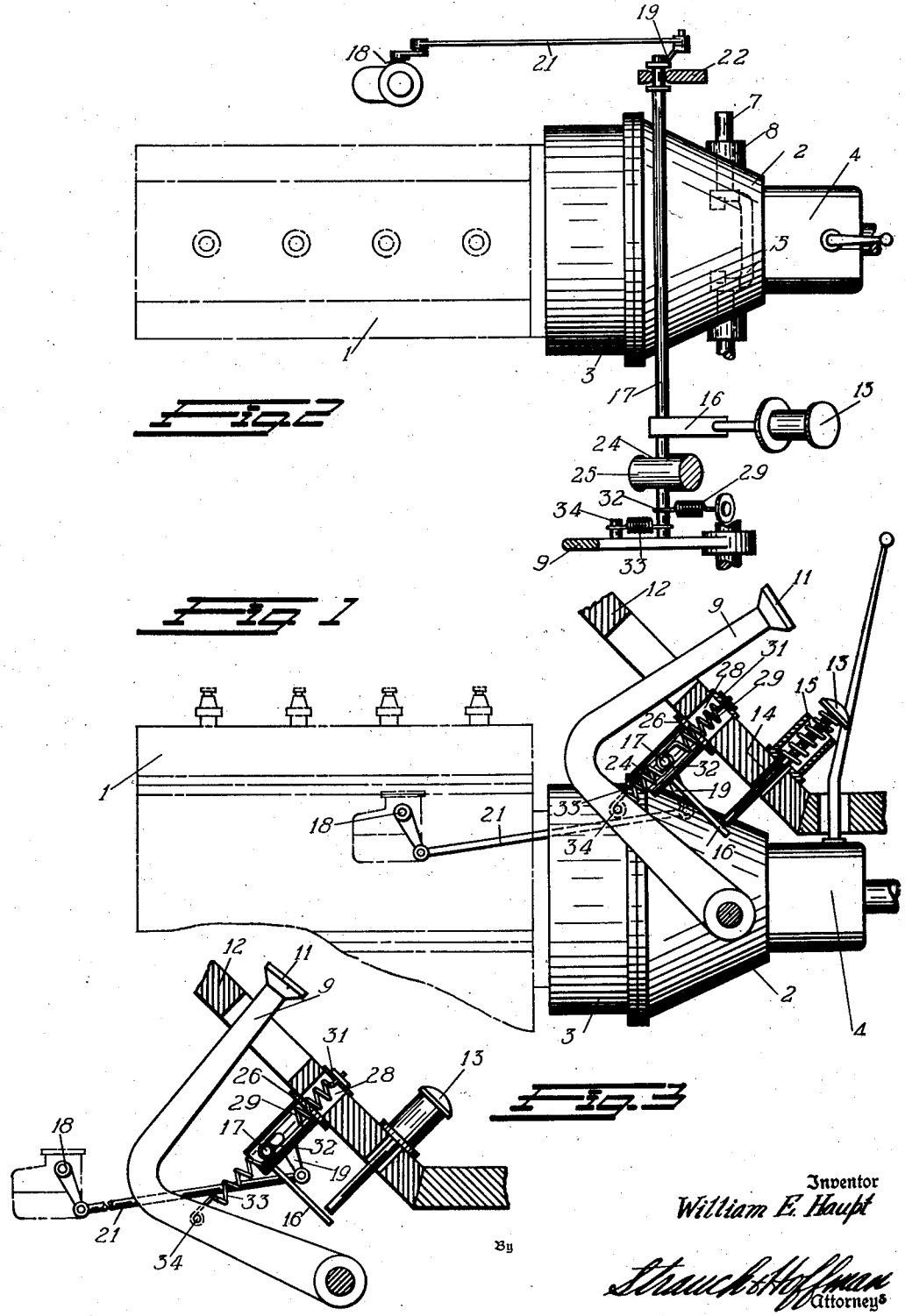

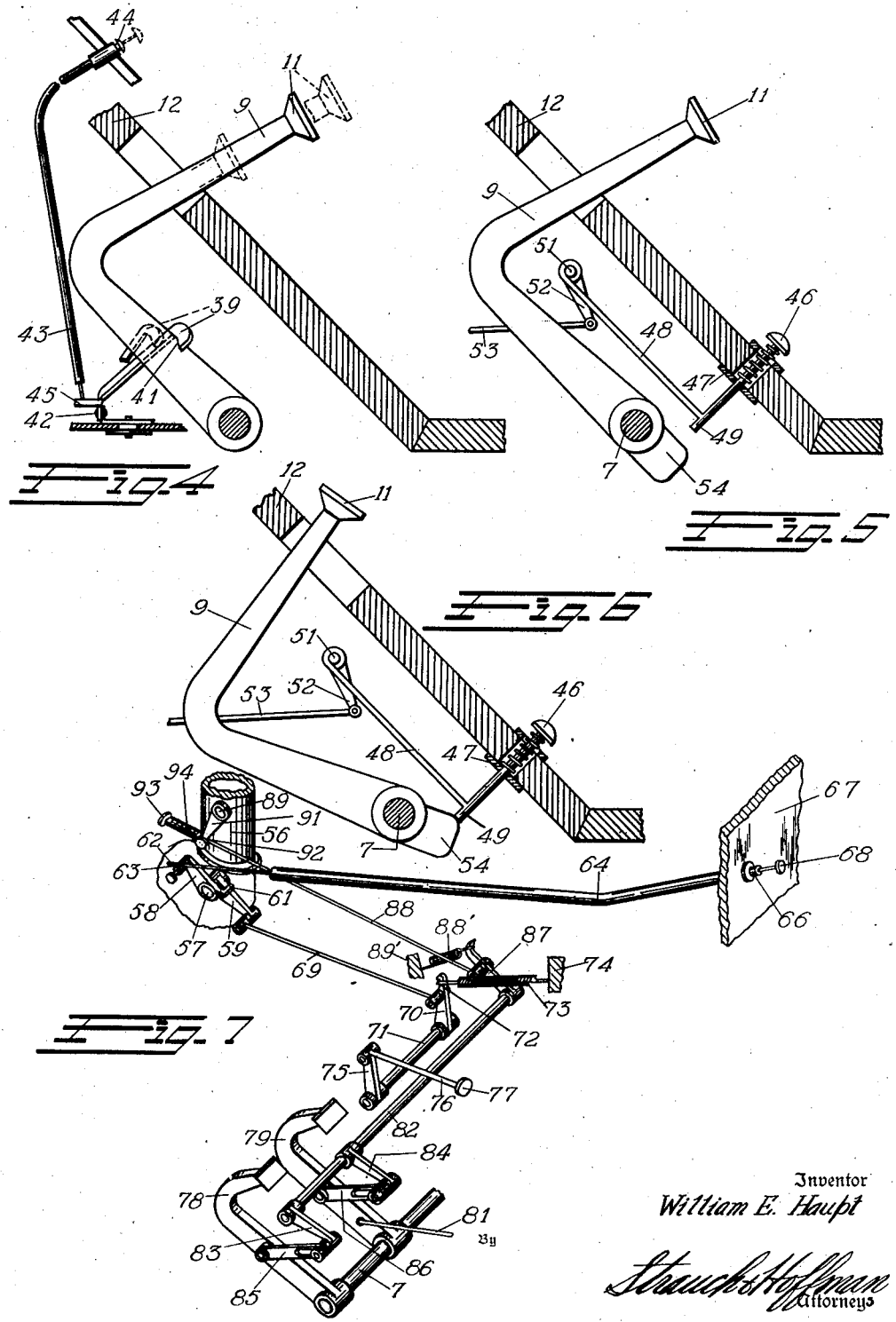

2,132,567

UNITED STATES PATENT OFFICE 2,132,567

CONTROL AND DRIVING METHOD AND APPARATUS

William E. Haupt, Westville, N. J., assignor to Automatic Drive and Transmission Company, Gloucester City, N. J., a corporation of New Jersey Application January 21, 1932, Serial No. 588,023

5 Claims. (Cl. 192—.01)

The present invention relates to control and drive methods and apparatus, and more particularly to control and drive methods and apparatus utilizing self-operating or automatic clutch mechanisms. My invention is applicable to the control of various types of stationary industrial power applications such, for example, as the operation of hoist mechanisms, excavating machinery, drives, and the like, but in the preferred embodiments of the invention hereinafter set forth arrangements are disclosed especially adapted for the drive and control of motor vehicles from sitting position.

In vehicles embodying automatic or self-operating clutches provided with a manual control of the well known Powerflo clutch type illustrated in copending application Serial Number 488,757, filed October 15th, 1930, which has eventuated in Patent No. 2,003,324, dated June 4, 1935, and in which centrifugally operated mechanism causes a full release of the clutch when the engine speeds drop to idling speed or below and driving engagement at speeds above idling speed, it is possible for an operator of a vehicle to cause manual disengagement of the clutch, then to race the engine and with the engine racing and the automatic mechanism in full engaged position, to release the manual clutch pedal, thereby imposing a severe strain on the clutch and vehicle mechanisms. A clutch of the type referred to above and provided with a manual control is disclosed in Patent No. 1,822,716 to H. H. Vail, granted September 8, 1931.

It is furthermore possible in motor vehicles equipped with such self-operating clutches and the usual types of controls, to apply the vehicle brakes with the vehicle moving and the transmission in gear, and at the same time to open the throttle to speed the engine, thereby imposing excessive slippage and wear on the clutch faces.

Accordingly a primary object of the present invention is to provide controls that will prevent all possibility of abuse of self-operating clutches of the character mentioned.

Another object of the present invention is to provide a novel vehicle drive and control arrangement in which an automatic or self-operating clutch forming a part of the driving mechanism of the vehicle, and the vehicle clutch, brake, and engine throttle mechanisms are interconnected so that the throttle can be opened only when the brake and clutch pedals are released.

This invention also provides a novel combination control for a self-operating clutch, braking, and throttle mechanism of a throttle controlled power drive, permitting efficient operation of motor vehicles and various industrial drives with a maximum of safety, while at the same time securing increased smoothness of operation, and a material reduction in maintenance cost.

Still further objects of the invention will appear as the description thereof proceeds with reference to the accompanying drawings in which:

Figure 1 is a diagrammatic side elevation showing the essential parts of my improved drive and control arrangement applied to a motor vehicle.

Figure 2 is a diagrammatic plan view of the drive and control arrangements shown in Figure 1, with parts broken away for the sake of clearly illustrating the same.

Figure 3 is a detail view of the device disclosed in Figure 1, with the clutch pedal fully depressed.

Figure 4 is a detail view of the means employed to lock the clutch pedal in its intermediate position.

Figure 5 is a detail view of a modification for producing the same result as that attained by the device in Figures 1, 2 and 3.

Figure 6 is a view similar to Figure 5, showing the parts in the positions they assume when the clutch pedal is depressed.

Figure 7 is a diagrammatic view in perspective of a further modification of my controlling mechanism.

Figure 8 is a view similar to Figure 7 of a further modification wherein the hand throttle is incorporated in the controlling mechanism, and, Figure 9 is a diagrammatic view in perspective of a device which produces the same result as that shown in Figure 8, employing, however, a different mechanism.

As shown in Figures 1 and 2 the reference character 1 designates an internal combustion engine of any well known type, which is suitably supported (in a manner not shown), in the chassis of the vehicle.

The motor 1 is provided with a flywheel housing 3 of any well known construction to which is bolted clutch housing 2, within which a centrifugally operated automatic or self-operating clutch, preferably of the general type illustrated in copending application S. N. 488,757 filed October 15th, 1930, is located, and in which a set of centrifugally operated weights are arranged. As will be more fully understood by reference to said copending application or said patent referred to above, when engine 1 is operating at or below idling speeds or is at rest in automatic position, the centrifugal clutch operating weights are retracted and cause disengagement of the driving and driven clutch members. When the engine speed increases above idling speed the driving and driven clutch members are brought into engagement with increasing pressures until at operating speeds of the engine at which the maximum torque is developed, the driven shaft, leading to the usual multi-speed transmission 4 is driven without slippage at engine speeds.

As will be clearly understood by reference to said copending application the driving and driven clutch members may be manually separated independently of the centrifugal weight operation through actuation of clutch throwout yoke 5 which shifts a clutch throwout bearing in well known manner to retract the driven clutch plate from engagement with the driving clutch plate, thereby disconnecting the driven shaft from the engine 1. The lower end of clutch throwout yoke 5 is rigidly secured to and mounted for rotation with clutch throwout shaft 7 journalled in suitable bearings 8 in flywheel housing 2. Rigidly secured to a projecting end of clutch throwout shaft 7 is clutch pedal 9, the upper end of which carries a suitable pad 11.

Since the structure so far developed is common to all of the modifications of my invention, further discussion and illustration of the same in connection with the remaining modifications will be omitted, since it will be understood that this structure is the same throughout.

The device illustrated in Figures 1 to 3, inclusive of the drawings will now be described. Mounted in the floor board 12, which floor board is common in vehicles of this type, is an accelerator pedal 13. The accelerator pedal is slidably mounted in an aperture 14 in the floor board, and is urged in retracted position by a spring 15 in well known manner. The lower end of the accelerator cooperates with the end of lever 16, which lever in turn is rigidly mounted on shaft 17, to rotate the shaft and, accordingly open or close the throttle valve 18 of the carburetor through the medium of lever 19 also mounted on shaft 17. Lever 19 is connected to a link 21, which link is pivotally connected to the carburetor throttle valve 18. One end of shaft 17 is rotatably mounted in the support 22 which is also secured to the floor board 12. Bearing support 22 is provided with a bearing that will permit rotation of shaft 17, and will at the same time allow the other end of the shaft to oscillate about the bearing as a fulcrum. The reason for providing for such oscillation will hereinafter appear.

The other end of shaft 17 is slidably and rotatably mounted in the slot 24 of bearing member 25, which bearing member is provided with a flange 26 which is, in any suitable manner, secured to the underside of the floor board 12. Disposed within a bore 28 formed in the floor board is a coiled tension spring 29, which is secured against the floor board by means of any suitable fastening means 31 or the like. The other end of spring 29 is provided with a hook portion 32 which engages around the shaft 17, which structure accordingly urges shaft 17 upward. Also hooked around shaft 17 is a spring 33 which is heavier than spring 29, which has the other end thereof hooked around a pin 34 mounted on clutch lever 9.

The operation of the structure so far developed, will now be described. The clutch pedal as shown in Figure 1 is in the correct position it should assume for automatic operation of the clutch mechanism. At this time it will be noted the accelerator 13 may be operated to depress the lower end of lever 16 to rotate shaft 17 and open the throttle, the shaft 17 at that time being parallel to the floor board in that the same is disposed in the upper end of slot 24 of bearing member 25. No abuse of the motor or power transmitting parts of the mechanism can be effected while they are disposed in this position, in that it will be remembered from the operation of the automatic clutch, that if the accelerator was suddenly depressed, the engine would not race, but would be resisted from such course by the clutch automatically taking hold and starting the vehicle smoothly and without any danger of stalling.

When an automatic clutch is used without the pedal and throttle hook-ups just explained, it is possible under some conditions to lose the automatic benefits of smooth pick-up, non-engine stalling, and non-engine racing. For instance, if the clutch pedal is depressed, releasing clutch manually, the operator can open throttle which speeds up the motor, throwing the centrifugal weights and automatic plate into their automatic driving position. Under these conditions, pick-up, engine stalling and engine racing is entirely up to the operator since the clutch is not functioning as an automatic clutch when he releases the clutch pedal to start the car. However, it will be noted that the structure just developed effectually prevents such improper operation in that the spring 33, is placed under stress due to the depression of the clutch pedal, which accordingly rotates shaft 17 about the bearing 22 at the fulcrum point against the action of the weaker spring 29. The throttle shaft 17, when in this position, it will be noted, disposes the lever 16 away from or out of alignment with the lower extremity of accelerator 13, and the parts accordingly cannot cooperate to rotate the shaft 17, with consequent opening of the carburetor throttle and racing of the engine.

In this connection it will be noted that the structure just developed, could be used in automobiles provided with the conventional type of clutches of today, and would function in the same manner, namely, they would prevent the undue racing of the engine while the clutch was disengaged, so that if the clutch was inadvertently dropped back suddenly into engaged position, wear and strain on the parts would be avoided due to the low engine speed existing at this time.

In Figure 4 I have disclosed a device for locking the clutch pedal 9 in intermediate position, that is, the position where it is disposed when automatic operation of the clutch is desired. This locking means comprises a hook member 39 provided with a clutch pedal engaging face 41, which hook member is pivoted at 42 on any suitable stationary part of the vehicle such as the clutch housing. This hook member is moved into its operative or inoperative positions by means of a Bowden wire construction 43, which is provided at its upper end with a friction adjusting means and an operating knob 44, which is preferably mounted on the vehicle dash for ease of manipulation. The end of the wire is attached to a lateral extension 45 of the member 39 for rotating it about its pivot and consequently swinging it into operative and inoperative position.

It will be remembered that during automatic operation thereof the clutch cannot be engaged when the motor has stopped. However, in operating clutches of the character mentioned, it is frequently desirable in winter, when the battery is low, to start the motor by coasting or towing the car, with the engine in driving connection with the rear wheels. This is effected by withdrawing the hook member from engagement with the clutch by manipulating the knob 44. By virtue of this adjustment the clutch is allowed to retreat into its retracted position, at which time manual operation of the clutch may be effected. When the car has been started in this manner, or the use of the clutch manually is no longer desired, the bar may be swung back into operative position to hold the clutch pedal in its intermediate automatic position. In view of the fact that I have filed a separate application, Serial Number 595,184, filed February 25, 1932, covering this structure, I make no claim thereto in the present application. Moreover in view of the fact that the structure used in all of the various modifications is identical, I feel it unnecessary to show the same in combination with each modification, it being understood that this structure may be combined with each clutch pedal disclosed.

In Figures 5 and 6 I have shown a further modification wherein the floor board 12 is shown as being provided with an accelerator pedal 46 which is extended through and guided by plate 47 which is attached to the rear surface of the floor board. Integral with or secured thereto in any suitable manner, and at right angles to the pedal, 46, is a lever member 48. At the junction of the members 46 and 48 there is formed an extension 49, the purpose of which will hereinafter appear.

Lever 48 is hooked around or secured to, throttle shaft 51 and is designed to rotate therewith, the throttle shaft being journaled and supported in the vehicle in any suitable manner, as for instance by bracket structure from the clutch housing. At the other end of shaft 51 is fixedly mounted a lever 52, which carries at its ends a link 53 which is connected to the carburetor throttle valve in well known manner. Mounted on the shaft 7, which carries clutch pedal 9, is a cam member 54 which is mounted opposite the extension 49 for cooperation therewith.

Referring to the position of the parts illustrated in Figure 5, it will be noted that the clutch pedal is in position for automatic operation of the clutch. It will also be noted that cam member 54 is disposed out of the path of extension 49 whereby the accelerator may be depressed to open the throttle of the carburetor to give the engine speed which is desired. Should the operator of the vehicle, through inadvertence or otherwise, attempt to race the engine before allowing the automatic clutch to engage, this will be effectively prevented by the cam 54 the parts then being disposed as illustrated in Figure 6. In this figure the clutch pedal is shown as fully depressed at which time the cam 54 has swung up into position under the accelerator extension 49, accordingly locking the said accelerator against downward movement, and consequent opening of the throttle. Hence when the clutch pedal is depressed the throttle will be closed, and in the event that the clutch is depressed while the accelerator is held in depressed, or in an open throttle position, the camming of member 54 against extension 49, will close the throttle by pushing up the accelerator.

In Figure 7 I disclose a diagrammatic view of a control device wherein a carburetor 56 is provided with two throttle valves, which, in combination with the controlling device disclosed in connection therewith produces the desirable results obtained by the previous structure set forth, and in addition coordinates the clutch mechanism with the foot brake mechanism, and allows the setting of the hand throttle to remain unchanged throughout the gear shifting and declutching operation. Carburetor 56 is provided with a conventional throttle valve, which has mounted on the shaft 57 thereof, levers 58 and 59. Lever 58 is loosely or rotatably mounted on the shaft 57 and carries at its end a hooked extremity 61 which extends parallel to shaft 57 in the path of lever 59, which is fixed on the shaft to rotate the throttle valve in the manner desired. Lever 58 is controlled in its swinging movement by a Bowden wire construction, wherein the wire member 62 thereof is secured to the free end of the lever 58, as at 63. Wire 62 passes through a housing 64 and into the frictional socket member 66 which in turn is secured to the dashboard 67 of the vehicle. Wire 62 carries at its extremity a control knob 68 for manipulating the lever 58 and consequently the throttle 57.

As before stated lever 59 is secured to the shaft 57 and carries at its free end a link 69 which in turn is pivotally secured to the free end of lever 70, which is rigidly fixed on throttle shaft 71 which shaft is rotatably mounted in the vehicle in well known manner. Lever 70 is extended beyond the pivotal connection with link 69 and carries at its extended portion 72 a spring 73 which is secured to any stationary support in the vehicle such as at 74. At the other end of shaft 71 is secured a lever 75 which is similar to lever 70 and is pivotally connected to link 76, which link represents the accelerator pedal, and carries a foot engaging button 77 at the end thereof.

Of course it will be understood that the exact hand throttle control and the exact accelerator control that I have disclosed may be replaced by any other well known types of control without sacrificing the advantages of my structure, these particular controls having been shown merely for the purpose of clearly illustrating my invention.

Keyed on the clutch shaft 7, is clutch pedal 78. Rotatably mounted on the clutch pedal shaft 7 is a brake pedal 79 which is provided with a brake rod 81 for actuating the brake mechanism in well known manner. Disposed above the brake and clutch pedals, and out of the swinging movements thereof, is rotatably mounted a control shaft 82, which is supported in any well known manner and which carries at its ends levers 83 and 84 which are pivotally connected to the clutch and brake pedals respectively by means of slotted links 85 and 86. Thus it is seen that by depressing either the brake or the clutch pedal shaft 82 will be rotated. The other end of the shaft 82 carries a lever 87 which in turn pivotally carries a link 88. A spring 88' is secured at one end to lever 87 and at the other end to a suitable support as at 89'. This spring retracts the shaft 82, and links 85 and 86. Disposed in the carburetor uptake is a second throttle valve having shaft 89, which shaft carries lever 91 at the end thereof, and is rigidly secured thereto. This second throttle valve I term an auxiliary throttle valve, in that it is not used to govern the speed of the vehicle while in motion, but is merely used to cut the fuel mixture supplied to the engine down to idling proportions, when certain operations are being effected. Link 88 passes through an aperture 92 in the lever 91 and carries an enlarged portion 93 at the end thereof. A coiled compression spring 94 is disposed about the link 88 and between the enlargement 93 and the lever 91 for a purpose to be presently described.

The operation of the device which has just been described is as follows. Assuming that the car is in motion, and the throttle operating button 68 has been frictionally adjusted in the position corresponding to the desired speed of the vehicle, that is, to give the desired throttle opening, in which position the throttle will be held until readjusted by manipulation of button 68. To retard the vehicle the brake pedal is depressed, which applies the vehicle brakes and through link 86 closes the auxiliary throttle. When the vehicle has decelerated to a speed conforming to engine idling speed, the clutch automatically disengages, and the vehicle shortly thereafter will come to rest, assuming that the brake application has not been discontinued. The clutch pedal has remained unaffected during this operation due to the lost motion connection existing in links 83 and 84. Should a careless operator attempt to abuse the clutch by disengaging it, racing the engine and suddenly releasing the clutch pedal, no abuse can result, because, in the present device, as soon as the clutch is depressed, this action closes the auxiliary throttle through their connecting linkage, thus, the engine can only be operating at substantially idling speed when the clutch is released. It will therefore be seen that when either the clutch or the brake pedal is depressed, the engine throttle will be closed, and the engine cannot again be supplied with fuel to operate it faster than idling speed until both the clutch and brake pedals are released.

With either the clutch pedal or the brake pedal depressed, the auxiliary throttle will be closed, the engine speed will drop to idling and the automatic clutch mechanism will disengage the clutch driving members from the clutch driven member until the engine is again accelerated by opening of the throttle to speed the engine above idling speeds. In traffic, the operator can therefore set the hand throttle to give the desired maximum vehicle speed, and when he desires to decrease the vehicle speed or stop for traffic, all that he will be required to do, is to depress the brake pedal, which closes the auxiliary throttle, and at the same time the vehicle is decelerated by virtue of the brake application. If the vehicle slows down to a speed conforming to the idling speed of the engine, the clutch will automatically release, and the vehicle may be brought to a full stop by brake application, or, if traffic conditions warrant it, the speed may be immediately picked up by release of the brake pedal resulting in the immediate opening of the throttle, and subsequent clutch engagement.

With the vehicle stopped and the engine operating at idling speeds, upon release of the brake pedal, the throttle will immediately be opened the desired amount, and as the engine speeds up, the clutch disclosed in said pending application will pick up the vehicle in high gear under normal operating conditions without the necessity of shifting the gears in the transmission. When a quick pick-up is desired, or the vehicle is stopped on a hill too steep to permit pickup of the vehicle in high gear, the operator can shift into a lower gear and when the brake is released the vehicle will pick up very rapidly. After such an operation, to again get into high gear or direct drive, the operator may depress clutch pedal 78 in the usual manner to manually disengage the clutch in the usual manner. As soon as the clutch is released in this manner, the throttle, which was closed upon actuating the clutch pedal, again opens to a predetermined position, as determined by the hand throttle position.

Thus it is seen, that the auxiliary throttle is entirely independent of the regular throttle, and accordingly does not affect the same in any manner whatsoever. A further observation that should be made in connection with the auxiliary throttle, is, that when in its so called closed position it is not entirely closed but is only closed so far as to cause the engine to operate at idling speed. The spring 94 compensates for any discrepancy in the amplitude of the movements of the link 88, and lever 91, as defined by the usual stops that are provided for throttles.

While I have shown a specific control organization, it will be understood that the structure thereof can be varied within wide limits according to the particular vehicle to which the same is to be adapted. For instance, if the carburetor is located on the left hand side of the engine of the vehicle which is to be equipped with this control, instead of the right hand side, the control organization would be varied accordingly, but after such variation the device would function in the same manner as before.

In Figures 8 and 9 I have disclosed two modifications of my device wherein I obtain the same results that are obtained in the device just disclosed, without the necessity of employing an auxiliary throttle valve in connection therewith.

Referring to Figure 8, the carburetor 95 is provided with the usual throttle valve having shaft 96 extending therefrom. Mounted on shaft 96 is the lever 97 which is also common in carburetors of this type and which lever has the link 98 pivotally connected thereto. The lower end of link 98 is pivotally connected to the lever 99, which is fixedly mounted on rotatable shaft 101. Lever 99 has an extension 102 formed thereon which extends beyond the pivotal connection of link 98. A tension spring 103 is secured to extension 102 at one end, and is fastened at the other end thereof to any suitable part of the vehicle, as at 104. Thus it is seen that lever 99 and link 98 are urged downwardly under the action of spring 103.

Shaft 101 has fixedly mounted thereon fingers 105, 106, and 107, the purpose of which will be set forth hereinafter. Mounted on the clutch shaft 109, is the clutch pedal 110, which has a hub portion 111 which carries a cam member 112 thereon. Mounted on the same shaft, but freely rotatable with respect thereto, is the brake pedal 113 which has a hub portion 114 which is similar to the hub portion 112 of the clutch pedal and has a similar dog 115 mounted thereon.

Also mounted for rotation on the clutch shaft 109 is the accelerator pedal 116 which is urged upwardly or in clockwise direction by means of tension spring 117 which is secured thereto and to a suitable stationary support such as 118. Spring 117 is stronger than spring 103, and through the action of cam 119 formed on the pedal 116, cooperating with finger 107, the throttle is urged toward closed position. The accelerator 116 has formed thereon adjacent the cam 119, a finger 120. Rotatably mounted on shaft 109 is a lever 121 which is provided with a lateral finger 122 for cooperation with finger 119 of the accelerator pedal. Member 121 is rotated by means of a Bowden wire construction, having the wire or control member 123, connected thereto at 124. Wire 123 extends through the housing 125 to the friction control device 126 which is disposed on the dash 127 which wire terminates in a knob 128. Since this construction is well known, and has been used in connection with carburetor choke controls, it is thought that further discussion thereof is unnecessary.

From the throttle positions indicated in the drawings, it will be noted that the throttle is urged into open position by the spring 103 at all times. Moreover, it will be also noted that accelerator 116 is also urged in closed position by the spring 117. However, the strength of spring 117 is sufficient to cause the throttle shaft to be actuated to closed position against the action of spring 103, providing no pressure is applied to the accelerator pedal at this time.

The operation of this device is as follows: The manual control knob 128 may be employed to open the throttle to any desired position, through the engagement of the lateral finger 122 with the projection 119 of the accelerator pedal, thus causing the accelerator pedal to be depressed a certain amount, and consequently allowing the finger 107, with which it is engaged, to rotate in a clockwise direction, and consequently cause the rotation of the lever 99 and lever 97 mounted on the carburetor throttle valve. Due to the lost-motion connection that is provided, the accelerator pedal 116 may be depressed at any time without disturbing the manual throttle setting. Assuming that the vehicle is under way and the throttle is set in a certain position, giving the required throttle opening, all that is necessary to do, in order to bring the vehicle to a stop, is to depress the brake pedal 113, which, through the medium of cam members 115 and 106, the shaft 101 will be properly rotated to close the throttle, and when the car has reached a speed which substantially corresponds to engine idling speed, the clutch will be disengaged and, the engine will drop to idling speed. The brakes thereafter will bring the vehicle to rest. In the event that the clutch pedal is actuated instead of the brake pedal, the cam members 112 and 105 will rotate the shaft 101 the required degree to produce the throttle movement to idling position. It will be noted that during both of these operations the hand throttle setting is undisturbed, in that the hand lever 122 has not been moved during the operation.

The device disclosed in Figure 9 has the same operating characteristics, from the driver's standpoint, as that of Figure 8, and is characterized by a different association of control elements. The carburetor 131 is provided with the usual throttle having shaft 132, upon which shaft is mounted a member having arms 133 and 134, which function as levers. Pivoted on the free end of arm 133 is a link 135 which has its lower end pivotally connected to a lever 136 which is keyed or otherwise fixed on shaft 137. Shaft 137 is rotatably mounted in the vehicle in any suitable manner such as by brackets extending from the clutch housing, and has rigidly fastened thereto, two cam members 138 and 139. Clutch operating shaft 141 has the clutch pedal 142 rigidly mounted thereon and also the brake pedal 143 loosely mounted thereon. The clutch and brake pedals have collars 144 and 145 formed thereon which collars are provided with cam members 146 and 147 respectively which cooperate with the other cam members, 138 and 139, disposed on the shaft 137.

The accelerator or throttle shaft 148 is rotatably supported in the vehicle in any suitable manner, and carries the finger 149 thereon which cooperates with the accelerator pedal 151 in well known manner. Rigidly fastened on one end of the shaft 148 is a member 152 which cooperates with a similar member 153 mounted on shaft 154 which is disposed approximately at right angles to the first named shaft. As shown in the drawings, shaft 154 extends up the steering column of the vehicle and has a manual control member 155 mounted thereon adjacent the steering wheel. The manual control member 155 cooperates with a notched segment 156 provided on the steering column, in well known manner, to hold shaft 154 in various adjusted positions. From this latter structure it will be seen that upon rotation of manual member 155 the shaft 148 will be rotated through the medium of the members 152 and 153. This rotation of shaft 148 is utilized to actuate the carburetor throttle through the medium of the connections about to be described. Mounted on the other end of shaft 148 is a lever 158 which has a link 159 pivoted thereon, and extends beyond the pivot point to form an extension 161. A tension spring 162 is connected at one end to the extension 161 and at the other end to a stationary support in the vehicle such as 163, to urge the shaft in a clockwise direction. Carried at the end of link 159 is a tubular housing member 164 which is closed at the open end thereof by an apertured, threaded cap 165. Disposed within the housing is an expansion spring 166 which acts at one end upon the closed end of the housing, and at the other end bears against a plunger 167 which is carried by a link 168, which in turn passes through the aperture in the cap. Link 168 is pivotally connected to the carburetor lever member 134. Due to the association of the tubular member 164 with the plunger 167, it will be noted that links 159 and 168 constitute a single link, with means thereon for allowing a contraction thereof when undue pressure is placed thereon.

While the operation of the device just described is fairly obvious from the description and the drawings, a brief outline of the operation of the same will now be given. Assuming that the vehicle is proceeding under power, and the clutch is operating as a self-operating or automatic clutch, and also that the hand throttle, or the accelerator has been set to give the desired throttle opening, if it is desired to stop the vehicle, all that is necessary for the operator to do is to merely depress the clutch pedal. Upon depressing the clutch pedal the dog member 146 carried thereby will in turn depress the member 138 carried by shaft 137 and accordingly produce rotation of the shaft to move the link 135 upward and through the medium of lever member 133 close the throttle to idling position. The brake 143 is then applied and the vehicle brought to a stop through the medium of the brake mechanism. The vehicle may also be stopped by the application of force to one member, namely, the brake pedal 143. The brake pedal 143 is depressed and the dog or cam member 147 carried thereby is forced against the cam member 139 carried by shaft 137, to cause the shaft to rotate in a manner to cause link 135 to be elevated and thus close the throttle. The clutch will not disengage at this time, but will remain in engagement, but since the engine cannot exert any forward motion producing effort on the vehicle due to the throttle thereof being closed, and hence the braking power of the engine is utilized to bring the car to a stop. When the car has slowed down sufficiently so that the engine speed corresponds to idling speed, the clutch is disengaged by virtue of the automatic mechanism, and the engine merely idles while the brakes are utilized to bring the car to the final stop. In no event can the engine be caused to race while the clutch is disengaged, either automatically or manually.

During both of the above modes of operation it was assumed that the throttle was manually adjusted by means of the member 155 in a predetermined position to give the maximum speed or power desired. When the clutch or the brake pedal was depressed, the throttle was closed, and the hand throttle setting was not disturbed in any way, since the link 168 in moving against the throttle setting merely caused the plunger 167 to compress the spring 166 a certain degree, causing no motion whatever of the link 159 and its associated elements. Thus it follows, that when it is desired to start the vehicle again, all that it is necessary to do is to accelerate the engine, by either releasing the depressed clutch or brake pedal (assuming that the car is still in high gear), such operation opening the throttle to predetermined position. This speeding up or acceleration of the engine causes the automatic clutch to engage when the engine speed has reached a sufficient degree to prevent stalling thereof, and the vehicle then picks up as before.

As has been stated before, one manner in which these clutches may be abused is by racing the engine with the clutch disengaged manually, followed by a quick release of the clutch, which results in the clutch taking a violent hold of its opposite member which produces a severe strain, with resulting damage to the entire power transmitting parts to the rear wheels of the vehicle. This structure effectively prevents such abuse, in that, as soon as the clutch is depressed, the finger 146 carried thereby cooperates with finger 138 and rotates shaft 137 in such a manner as to close the throttle, and hold it in closed position until the clutch is released.

A second form of abuse that may be practiced upon this type of clutch in the hands of an inexperienced driver or a driver who is careless, is the process of depressing the brake pedal while the car is under power, and working under substantial throttle opening, whereby the vehicle speed, and consequently the engine speed, is pulled down to a speed near to idling and the consequent partial engagement of the clutch occurring at that time causes excessive slippage thereof, and produces excessive wear on the clutch facings. This abuse is also prevented by this structure in that the brake pedal, when depressed, closes the throttle through the medium of the dog 147 carried thereby cooperating with the member 139, causing shaft 137 to rotate clockwise and through the medium of links 35 and 37 close the throttle to idling position. Since the engine is only being supplied with enough fuel to cause the same to operate at idling speed, the clutch cannot be engaged at all. In traffic, the operator can therefore set the hand throttle to give the desired vehicle speed, and when the desires to slow the vehicle speed or stop for traffic, all that he will be required to do is to depress the brake pedal 143, which closes the throttle and causes the engine speed to drop to idling speed through the agency of the throttle connections, and at the same time the brake mechanism will bring the vehicle to a stop. As soon as the vehicle slows down to a speed corresponding to the idling speed of the engine, the clutch will automatically release, and the vehicle may be brought to a full stop by brake application, or, if it is desired at this time, the speed of the vehicle may be immediately accelerated by release of the brake pedal with resultant immediate opening of the throttle and subsequent engagement of the automatic clutch.

It will be understood that the showings made of these various devices in the drawings have only been diagrammatic, with many parts of the vehicle removed for the sake of giving a clear illustration of my invention. It will also be understood that wide variations in the exact linkage employed in the various modifications may be used to effect the same result as that shown and such variations will probably have to be used in different installations depending upon the nature of the vehicle that is being supplied with my control mechanism. For instance, if it is desired to place the mechanism in a vehicle wherein the carburetor is located on the left hand side of the engine, and the device that is selected is especially adapted for a right hand carburetor type of engine, obviously quite a wide departure from the right hand type of mechanism will have to be made in order to adapt it to this type of car, which is only one illustration of the factors that influence the structure that it may be necessary to use in a particular installation.

A further feature of operation of my control device, which is present in all of the modifications thereof, will now be pointed out. As soon as the clutch pedal is depressed, the throttle of the engine is brought to idling position, where no more fuel can be supplied the engine than to cause it to operate at idling speed. Assuming that the clutch at this time is operating as an automatic or self-operating clutch, the clutch cannot be engaged by suddenly releasing the pedal since the engine must operate at a speed substantially above idling speed to cause the automatic mechanism to function and produce that result. Let us assume now that the clutch is manually disengaged, the engine has dropped to idling speed, and the clutch is no longer functioning as a self-operating or automatic clutch, that is, the locking member 39 has been swung out of the path of travel of the clutch pedal to allow the same to swing into its retracted position. If the operator should now suddenly release the clutch pedal no damage can be inflicted upon the mechanism since the engine speed is so low that the sudden engagement of the clutch would merely result in stalling the engine.

In conclusion it will be observed that I have provided a control device that insures correct operation of the vehicle driving mechanisms regardless of the operator's skill or the degree of care that he exercises. As a result of the smooth driving characteristics insured by my controls, the life of the vehicle is materially lengthened and operating costs are materially reduced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. For use with an internal combustion engine which is coupled to an automatic friction clutch of the character having a control member movable from an automatic position, wherein the clutch is disengaged at idling speed and automatically engages when the engine is accelerated from idling speed to a predetermined speed in excess of idling speed, to a disengaging position, wherein the clutch is disengaged at all engine speeds, fuel supplying means for said engine, said clutch being coupled to a load having a brake mechanism associated therewith, a control element for said brake mechanism and means interconnecting said control member and said brake control element to said fuel supplying means in such manner that the engine cannot be supplied with sufficient fuel to cause it to operate at speeds as high as said predetermined speed when said control member is disposed out of automatic position or said brake control element is actuated, whereby said clutch cannot be re-engaged until said control member is restored to automatic position and said brake mechanism is released, and means for controlling the speed of said engine independently of the connection of said control member and control element to said fuel supplying means.

2. For use with an internal combustion engine which is coupled to an automatic friction clutch of the character having a control member movable from an automatic position, wherein the clutch is disengaged at idling speed and automatically engages when the engine is accelerated from idling speed to a predetermined speed in excess of idling speed, to a disengaging position, wherein the clutch is disengaged at all engine speeds, a throttle for said engine, resilient means urging said throttle toward engine idling position, selective means for maintaining said throttle in a plurality of opened positions, against the action of said resilient means, and means interconnecting said control member and said throttle in such manner that the engine cannot be supplied with sufficient fuel to cause it to operate at speeds as high as said predetermined speed when said control member is disposed out of automatic position, whereby said clutch cannot be re-engaged until said control member is restored to automatic position, said selective means being connected to said throttle through a yieldable coupling, whereby said throttle may be closed to idling position by said control member without disturbing the setting of said selective means.

3. Vehicle drive and control mechanism comprising an internal combustion engine; a controlling throttle for said engine; an automatically operable clutch driven by said engine; said clutch embodying means for maintaining it disengaged at engine idling speeds and for automatically engaging it when the engine is accelerated to speeds substantially in excess of engine idling speed; vehicle drive means driven by said clutch; manually operated means for setting said throttle in various positions; a manually operable member disengaging said clutch irrespective of the engine speed; and means to cause closing of said throttle regardless of the position of said setting means when said member is operated to disengage said clutch; and a foot accelerator control operative to open said throttle only when said member is released.

4. Vehicle drive and control mechanism comprising an internal combustion engine; a controlling throttle for said engine; an automatically operable clutch driven by said engine; said clutch adapted to automatically engage when the speed of said engine is increased above the idling range; vehicle drive means driven by said clutch; a brake controlling member; a throttle position setting means operative to control the opening of said throttle; and means to cause closing of said throttle regardless of the position of said setting means when said member is operated, and a foot accelerator control for said throttle operative to open said throttle only when said member is released.

5. Vehicle drive and control mechanism comprising an internal combustion engine; a controlling throttle for said engine; an automatically operable clutch driven by said engine; said clutch adapted to automatically engage when the speed of said engine is increased above the idling range; vehicle drive means driven by said clutch; a manually operable foot pedal controlling said clutch; a brake controlling foot pedal; means operative to control the opening of said throttle; and means to cause closing of said throttle regardless of the position of said throttle controlling means when either of said foot pedals is actuated, and a foot accelerator control for said throttle operable to open said throttle only when said pedals are released.

WILLIAM E. HAUPT.